3,090,101
METHOD OF CONSTRUCTING A CORRUGATOR BELT
Zephir J. Chagnon, Loudonville, and Robert R. Kelleher, Latham, N.Y., assignors to Albany Felt Company, Albany, N.Y., a corporation of New York
No Drawing. Filed Aug. 26, 1960, Ser. No. 52,009
4 Claims. (Cl. 28—72.2)

This invention relates generally to belts for use in the manufacture of corrugated paper board and more particularly to an improved corrugator belt of needled construction.

During the commonly practiced method of manufacturing corrugated paper board the board is passed through a drying device comprising a group of upwardly facing flat hot plates and a blanket in the form of an endless belt with its lower run overlying the hot plates. The blanket is commonly referred to as a corrugator belt. The corrugated board or paper is passed between the hot plate surface and the belt with the upper surface of the board adjacent the lower surface of the belt, thus aiding to transport the paper over the hot plates, drying the adhesive and maintaining the paper in contact with the hot plate.

Corrugator belts commonly in use today are of interwoven construction. Three basic thicknesses of belt are available and used for this purpose. These are one-quarter (¼) inch, five-sixteenths (5/16) inch and three-eighths (⅜) inch.

As an interwoven corrugator belt stretches with use the linear weight and thickness decrease. Such a belt does not lose effectiveness as long as the reduction in thickness is uniform throughout the length and width of the belt. The completely woven belts in use today do not for the most part stretch in such manner that the resultant reduction in thickness is uniform throughout the length and width of the belt.

Resilient firmness or body is a highly desirable characteristic of a corrugator belt. The term "resilient firmness" as used herein shall be taken to mean the ability of the fabric to resist change in shape when subject to pressure and the tendency to return to original shape when deformed by pressure. Belts having this quality resist pressure perpendicular to the belt surface in a substantially uniform manner. When belts lose this quality the uniformity of pressure exerted upon the corrugator paper or board by the belt decreases. Corrugator belts in general use today are produced using all cotton, a fiber which loses strength rapidly when exposed to the high temperatures encountered on a corrugating machine. The lengthwise surface yarns exposed to the hot plates degrade in use, resulting in a reduction in the firmness of the product.

An additional difficulty encountered in the industry in the use of completely interwoven corrugator belts is that belts of this weave cannot be woven endless. If a belt is joined with clipper hooks on a machine to make it endless the hooks will mark the board making it difficult to print on the board later.

We have found that by constructing a corrugator belt by means of a needling process a new and superior blanket for this purpose is produced, resulting in boards of higher caliper. A blanket can be produced which is lighter so that a single broad blanket can be placed in a corrugator machine, rather than two running side by side, and which dries quicker so that the machine can be operated at a higher speed.

The invention herein disclosed has as its principal object the furnishing of a needled corrugator belt which possesses satisfactory qualities of firmness and excellent stability.

A further object of this invention is to provide an endless corrugator belt neither having nor requiring a seam.

Another object of this invention is to provide a corrugator belt that can be built up to any thickness desired.

Still another object of this invention is to provide an all-synthetic corrugator belt.

The corrugator blanket which is the subject of this invention comprises a woven base fabric and a plurality of fibers, mechanically locked to the base fabric by a needling process.

The base fabric is woven from yarns selected to give the base fabric bulk, strength and resistance to heat degradation. The base fabric must possess stability and allow for the proper passage of air and water vapor when the corrugator belt is used. The material from which the base fabric is woven and the weave itself must be selected with this in mind.

In its preferred form the base fabric of the belt which is the subject of this invention is woven of yarns formed from a synthetic fiber-forming material such as Dacron polyester (Dacron is a registered trademark of du Pont Co., U.S.A.,) or a Kodel polyester (Kodel is a registered trademark of Eastman Chemical Products, U.S.A.). The yarns from which the base fabric is woven are selected primarily to achieve the resultant required stability and for capability of resisting degradation in the presence of heat. Therefore, yarns possessing this quality which are natural yarns or yarns which are a blend of natural and synthetic fibers can be used.

The weave of the base fabric is preferably a two-ply weave, that is, two layers woven as one. The cross-wise yarns may float as well as bind the layers together.

In the preferred embodiment the yarns are ply yarns, for example, four-ply yarns and a medium twist is selected for the finished yarn.

In weaving the base fabric of the preferred embodiment, as an example, 28 lengthwise yarns and 12 crosswise yarns per inch were placed in the fabric in the loom. The base fabric so woven had, after processing, 32 lengthwise yarns and 8½ crosswise yarns per inch.

The base fabric is woven in the accepted fashion of weaving and if it is desired that it be woven in endless form this can be accomplished within the limitations of available weaving equipment.

After the base fabric has been woven a plurality of fibers are mechanically locked thereto by a needling operation. The plurality of fibers when applied to the base fabric are referred to herein as the "added section." The base fabric is passed through the needling loom and the fibers applied to both sides until the desired weight blanket has been achieved.

Although the added section, in the preferred embodiment, is formed entirely of synthetic fibers such as polyester fibers of the type from which the base fabric is formed, it can be formed of natural fibers or a combination of natural and synthetically formed fibers. The fibers selected are laid on the base fabric just prior to passing it through the needling machine. Several layers of fibers are generally required to give the resultant blanket sufficient body and weight. The fabric is passed through the needling machine as each additional layer is added. As the fibers are laid upon the base the blanket is advanced under a vertical reciprocating head to the underside of which is attached a plurality of needles. The needles are fashioned with tiny barbs and as the needles descend each barb grasps a number of fibers. As the needles penetrate the base fabric the fibers are forced into it and are left there as the needles recede on their upward stroke.

As an example, in forming the corrugator belt in accordance with the preferred embodiment of this invention, the needles used were of the so-called "close barbed no kick-up type." This needle was passed through the base carrying polyester fibers weighing in bulk 225 grains per square foot. The needle passed through in varying amounts up to ⅝". The base fabric was passed through the needling machine five times on each side in order to add fibers. The order was as follows: 3 passes to needle the back; 3 passes to needle the face; 2 passes to needle the back; 2 passes to needle the face. The distance the needle passed through changed as the thickness and firmness of the material changed. The final pass on the needle loom utilized a penetration of only ½" by the needles. While needling the material was held under 3500 lbs. of tension at all times. After each penetration of the needle the material was advanced .14", thus presenting a new area for the needles to act on. As a result, and due to the number of passes through the loom, each square inch of belt has 1500 to 2000 penetrations.

Of course, the type of needle, the amount of penetration, the amount of advance and the fiber used or quantities used depend solely upon the end product desired and can vary in accordance with the desired end product. The tension applied will vary also with width of blanket.

It may be found in certain applications that more passes on one side of the material than on the other may be desirable to provide greater wearing surface on one side of the blanket which is ultimately produced.

The resulting blanket is then finished in accordance with the particular application to which the corrugator belt is to be put. Generally, ordinary finishing procedures such as washing, extracting and drying are sufficient for this purpose.

If it is desired, the belt can be chemically treated during the washing operation with resins, elastomers or binders. These can be used to increase or amplify the desirable features of the blanket. The chemicals can also be applied, if desired, directly to the fibers prior to or during any of the above described processing.

The curing of chemicals can be accomplished in a curing oven after the blanket has been dried, if desired.

In addition, the belt is stabilized in the presence of heat. The amount of heat of necessity must be above the temperature to which the belt will be exposed when used, which is frequently around 350° F. During the stabilization operation the tension applied to the blanket must be greater than that ordinarily applied to a corrugator belt during normal operating conditions. So processed, the ultimate belt is stable to conditions more severe than those to which it is subjected on the corrugator machine.

In its preferred form the blanket is stabilized by exposing it to between 325° F. and 375° F. for five to fifteen minutes while under tension of between 100 to 200 lbs. per inch of its width on the tensioning rolls.

It is seen therefore that a satisfactory improved corrugator belt can be provided by the needling process as described above.

Thus, among others, the several objects of the invention as specifically noted above are achieved. Obviously, numerous changes in construction and rearrangement of the parts may be made without departing from the scope of the invention as defined by the claims.

We claim:
1. The method of constructing a corrugator belt consisting of weaving a two-ply base fabric, passing the base fabric through a needling machine to cover the surfaces of the woven fabric with a plurality of fibers mechanically interlocked therewith and then exposing the belt to elevated temperatures in the range of 325° F. to 375° F. while applying tension in the range of 100 to 200 lbs. per inch of width for a period of five to fifteen minutes.

2. The method of constructing a corrugator belt in accordance with claim 1 in which the base fabric is woven endless.

3. The method of constructing a corrugator belt in accordance with claim 1 in which the yarns from which the base fabric is woven and the plurality of fibers interlocked with the base fabric during the needling operation are formed from a polyester fiber-forming material.

4. The method of constructing a corrugator belt in accordance with claim 1 in which the base fabric is maintained under tension during the needling operation.

References Cited in the file of this patent

UNITED STATES PATENTS

| | | |
|---|---|---|
| Re. 21,890 | Walsh et al. | Aug. 26, 1941 |
| 1,742,338 | Bettison | Jan. 7, 1930 |
| 2,165,772 | Walsh et al. | July 11, 1939 |
| 2,588,228 | Gates | Mar. 4, 1952 |
| 2,748,445 | Skeer et al. | June 5, 1956 |
| 2,825,958 | Chandler | Mar. 11, 1958 |
| 2,943,379 | Foltz | July 5, 1960 |